(12) United States Patent
Wang et al.

(10) Patent No.: US 9,864,218 B2
(45) Date of Patent: Jan. 9, 2018

(54) SPIN MAGNETO-OPTICAL MODULATOR

(71) Applicant: Regents of the University of Minnesota, Minneapolis, MN (US)

(72) Inventors: Jian-Ping Wang, Shoreview, MN (US); Mo Li, Plymouth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 15/131,267

(22) Filed: Apr. 18, 2016

(65) Prior Publication Data
US 2017/0299904 A1 Oct. 19, 2017

(51) Int. Cl.
| | | |
|---|---|---|
| H04B 10/00 | (2013.01) | |
| G02F 1/095 | (2006.01) | |
| H04B 10/516 | (2013.01) | |
| H04B 10/80 | (2013.01) | |
| G02F 1/09 | (2006.01) | |
| G02F 1/01 | (2006.01) | |
| G02F 1/00 | (2006.01) | |
| H04J 14/00 | (2006.01) | |

(52) U.S. Cl.
CPC .......... *G02F 1/095* (2013.01); *G02F 1/0036* (2013.01); *G02F 1/0136* (2013.01); *G02F 1/092* (2013.01); *H04B 10/516* (2013.01); *H04B 10/801* (2013.01); *G02F 2203/15* (2013.01)

(58) Field of Classification Search
CPC .......... G02F 1/0036; G02F 1/09; G02F 1/091; G02F 1/092; G02F 1/093; G02F 1/13768
See application file for complete search history.

(56) References Cited

U.S. PATENT DOCUMENTS

2005/0180676 A1* 8/2005 Ellwood, Jr. ........... G02F 1/093 385/11

OTHER PUBLICATIONS

Bi et al., "On-chip optical isolation in monolithically integrated non-reciprocal optical resonators," Nature Photonics, vol. 5, Nov. 13, 2011, pp. 758-762.
Bi et al., "Magneto-Optical Thin Films for On-Chip Monolithic Integration of Non-Reciprocal Photonic Devices," Materials, vol. 6, Nov. 8, 2013, pp. 5094-5117.
Balakrishnan et al., "Giant spin Hall effect in graphene grown by chemical vapour deposition," Nature Communications, vol. 5, Sep. 1, 2014, 7 pp.
Wen et al., "All-optical switching of a single resonance in silicon ring resonators," Optics Letters, vol. 36, No. 8, Apr. 15, 2011, pp. 1413-1415.
Dotsch et al., "Applications of magneto-optical waveguides in integrated optics: review," J. Opt. Soc. Am. B, vol. 22, No. 1, Jan. 2005, pp. 240-253.

* cited by examiner

*Primary Examiner* — Daniel Dobson
(74) *Attorney, Agent, or Firm* — Shumaker & Sieffert, P.A.

(57) ABSTRACT

Techniques are described for a device that includes an optical channel configured to transport an optical signal. The device further includes a magnetic material with low optical absorption through which a portion of the optical signal is configured to flow. The magnetic material is configured to receive an electrical signal that sets a magnetization state of the magnetic material. The magnetic material is further configured to modulate, based on the magnetization state, the portion of the optical signal flowing though the magnetic material.

20 Claims, 4 Drawing Sheets

SPIN MAGNETO-OPTICAL MODULATOR

GOVERNMENT INTEREST

This invention was made with government funds under Agreement No. HR0011-13-3-0002 awarded by DARPA. The U.S. Government has rights in this invention.

TECHNICAL FIELD

The disclosure relates to optical systems and, in particular, optical modulators.

BACKGROUND

Electro-optical modulators such as electro-refractive modulators and electro-absorptive modulators modulate the phase or amplitude of an optical signal. A voltage or current controls a material's refractive index in an electro-refractive modulator to modulate the phase or optical absorption of an electro-absorptive modulator to modulate the amplitude of light. Because voltage and current need to be applied to the electro-optical modulators, the electro-optical modulators consume electrical energy due to capacitive load and resistive dissipation. Also, to hold the optical output state to a high or low requires that the voltage or current be sustained, and therefore, the electro-optical modulator tends to consume power even when not modulating.

SUMMARY

This disclosure describes an optical modulator having low optical absorption magnetic material where the magnetization state of this magnetic material is controlled without applying a magnetic field. As described in more detail, the magnetization state of the magnetic material sets the phase of an optical signal flowing through the magnetic material. By controlling the magnetization state, the optical modulator modulates the phase, amplitude, or polarization of the optical signal.

In some examples, the disclosure describes a device that includes an optical channel configured to transport an optical signal. The device further includes a magnetic material with low optical absorption through which a portion of the optical signal is configured to flow. The magnetic material is configured to receive an electrical signal that sets a magnetization state of the magnetic material. The magnetic material is further configured to modulate, based on the magnetization state, the portion of the optical signal flowing though the magnetic material.

In some examples, the disclosure describes a method that includes delivering an electrical signal to a magnetic material with low optical absorption. The method further includes configuring, based on the electrical signal, a magnetization state of the magnetic material. The method further includes applying an optical signal to the magnetic material. The method further includes modulating, based on the magnetization state, the optical signal.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
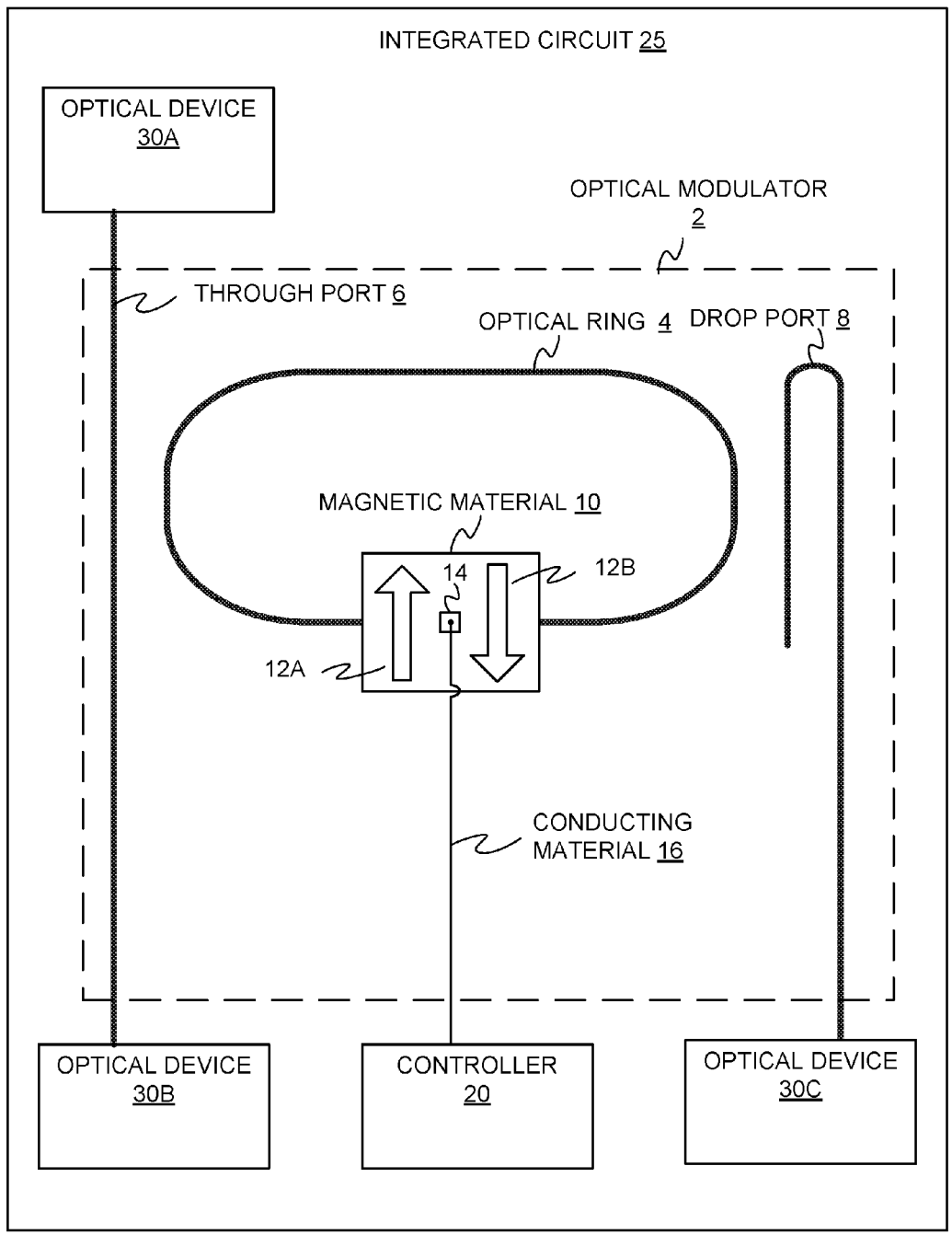
FIG. 1 is a block diagram illustrating an optical ring resonator including an optical modulator, in some examples of this disclosure.

There is a bottleneck in the future development of computers and integrated circuits with electrical interconnects due to insufficient bandwidth and increasing energy consumption per bit. The next stage of development in integrated circuits may rely on electrical interconnects with widths at or below 10 or 15 nanometers. One option to address this bottleneck involves replacing electrical interconnects with optical interconnects that consume less energy per bit and support a high level of multiplexing. However, optical interconnect technology tends to be for transmitting data over longer distances, such as with inter-chip and board-level communication. Such optical interconnect technology tends to be power intensive and not available for intra-chip communication. This disclosure describes example techniques for on-chip optical interconnects with lower energy consumption, relative to inter-chip communication of optical interconnects, in order to make optical interconnect technology viable for all applications.

For optical communication, an optical channel outputs a modulated optical signal, where the modulation indicates digital bit values. To provide the optical modulation, this disclosure describes a device that employs a magnetic garnet to modulate the phase, amplitude, and/or polarization of the optical signal. As described in more detail, a magnetization state of the magnetic garnet defines how the magnetic garnet modulates the optical signal. This disclosure describes setting the magnetization state of the magnetic garnet with electrical signals (e.g., spin torque, spin Hall effect, or electrical field) and without relying on magnetic field.

As one example, the device may have optical channels, or waveguides, including a through port and an optical ring resonator. The garnet may reside on the optical ring resonator and modulate optical signals travelling in the optical ring. The optical ring delivers optical signals to the garnet covered area to couple and interact with the garnet. The garnet modulates the optical signal, which in turn determines how much of the optical signal exits through a particular optical channel. The optical ring resonator may be small enough to fit on an integrated circuit chip that includes other optical devices.

As described above, the modulation of the optical signal is based on the magnetization state, or magnetic state, of the garnet. By switching the magnetization state of the garnet, the modulation of the optical signal changes. In some examples, the optical signal may experience different phase shifts, depending on whether the magnetization state of the garnet is in a first magnetization state (referred to as the positive state for brevity) or in a second magnetization state (referred to as the negative state for brevity).

This device uses an electrical signal to switch the magnetization state of the garnet. The electrical signal may produce a spin torque in the garnet, which switches the magnetization state if the spin torque is strong enough. The spin torque can be generated by spin Hall effect in some heavy metals, such as platinum (Pt), gold (Au) or tantalum (Ta). These spintronics effects may also occur in the alloys and multilayers of heavy metals, where multilayers are materials that are more than one molecule thick. In some cases, the electrical signal may only be needed when switching the magnetization state. Therefore, the device may not need an input electrical signal unless the magnetization state of the garnet is to change. This may mean that electrical power is not expended to maintain the modulation as electrical power is needed only when a change in magnetization state is needed.

FIG. 1 is a block diagram illustrating an optical ring resonator including an optical modulator, in some examples of this disclosure. Optical modulator 2 may reside on integrated circuit (IC) 25 (e.g., within a microchip, IC chip, processor, and the like) with other optical devices 30A-30C. Optical devices 30A-30C may be optical interconnects or optical sources. Integrated circuit 25 may include other electrical devices that do not use optical signals to communicate.

In some examples, for optical device 30A to communicate with optical device 30B, optical device 30A outputs an optical signal may pass from optical device 30A to optical modulator 2 by traveling in through port 6 (also referred to as an optical channel). Based on the resonance wavelength of optical ring 4, the optical signal passing through port 6 may couple (e.g., evanescent coupling) into optical ring 4 or not couple into optical ring 4. If the optical signal does not couple into optical ring 4, the optical signal may travel to optical device 30B in through port 6. If the optical signal couples into optical ring 4, the optical signal may not output to optical device 30B and may instead output via drop port 8 to optical device 30C. Drop port 8 and optical device 30C are optional and not required in every example. In this way, optical ring resonator may act as a switch, which functions to modulate the optical signal (e.g., controls whether the optical signal is outputted through port 6 or not).

Optical signals in optical modulator 2 may pass through optical channels such as optical ring 4, through port 6, and drop port 8. Optical ring 4, through port 6, and drop port 8 may comprise transparent or semi-transparent material such as silicon. Optical ring 4, through port 6, and drop port 8 may be classified as optical waveguides, which refers to physical structures that guide electromagnetic waves of the optical spectrum. All or a portion of an optical signal traveling within through port 6 may transmit into optical ring 4 via evanescent coupling and travel through optical ring 4 one or more times. The optical signal may continue to travel in optical ring 4, or optical ring 4 may transmit the optical signal to through port 6 or to drop port 8. Whether the optical signal outputs via through port 6 or drop port 8 may depend on a wavelength of the optical signal, the resonant wavelength of optical ring 4, which is set by the magnetization state of a magnetic material within magnetic material 10.

As an optical signal travels through optical ring 4, the optical signal passes through magnetic material 10. Magnetic material 10 may be made of a magnetic material with low optical absorption, such as garnet, which has unique magneto-optical characteristics. Magnetic material 10 may be made of a compound that includes garnet, such as yttrium iron garnet (YIG). Low optical absorption may mean that the magnetic material is transparent, semi-transparent, or that the magnetic material does not block the optical signal. Magnetic material 10 may be doped with rare earth element such as cerium (Ce) or thulium (Tm) to enhance the magneto-optical properties.

Arrows 12A and 12B may represent the magnetization state of magnetic material 10. A transition from arrow 12A to 12B, or vice versa, may cause a change in how magnetic material 10 modulates an optical signal. The magnetization state of magnetic material 10, which may be illustrated by arrows 12A-12B, modulates one or more of the characteristics of the optical signal passing through magnetic material 10. These characteristics of the optical signal may include a phase shift or a phase delay of the optical signal. This phase shift or phase delay causes a resonant frequency/wavelength of optical ring 4.

In the example techniques described in this disclosure, controller 20 outputs an electrical signal via conducting material 16 to set the magnetization state of magnetic material 10. Controller 20 sets the data that is included in the optical modulation by outputting an electrical signal to optical modulator 2, using the techniques described herein. Conducting material 16 may deliver an electrical signal to magnetic material 10 through node 14. Conducting material 16 may deliver the electrical signal directly to the magnetic material or may deliver the electrical signal to a proximate conductive layer that transmits the electrical signal past the magnetic material. Although only one node 14 is depicted, magnetic material 10 may include more than one node 14 for many reasons, including facilitating the return flow of the electrical signal through conducting material 16. The electrical signal may include a spin current, a voltage signal, or an electric field. The electrical signal may control the magnetization state of magnetic material 10. Conducting material 16, also known as a conducting device, may comprise one or more wires for delivering the electrical signal to magnetic material 10, as well as providing a return path for the electrical signal.

For example, for optical device 30A to transmit logic ones and logic zeros that form a digital bitstream, controller 20 may set the magnetization state of magnetic material 10, which in turn controls whether the optical signal couples or does not couple into optical ring 4. In this way, controller 20 modulates the optical signal that optical device 30A outputs, where the modulation of the optical signal represents logic ones and logic zeros. In other words, by controlling whether the optical signal outputs through port 6 or couples into ring 4, controller 20 controls the timing of whether optical device 30B receives an optical signal or not, which defines a logic one or a logic zero, respectively. As another example, by controlling whether the optical signal outputs through port 6 or couples into ring 4, controller 20 may phase modulate the optical signal, which forms as another way to implement optical communication.

As mentioned above, commonly used magneto-optic materials are magnetic garnets such as yttrium iron garnet (YIG). Garnet is an insulating material that can be magnetic and optically transparent, depending on the species of garnet. Some garnet species exhibit the magneto-optical effect such that the polarization of light rotates when it transmits through the material. The direction of rotation of light depends on the magnetic state, or magnetization state, of the material. By switching the magnetization state, the direction of the rotation of light switches. The rotation of polarization in a garnet is non-reciprocal because the effect is magnetic. The non-reciprocal polarization rotation of garnet means that the rotation angle depends on the direction that the light passes through the garnet. If a forward signal is rotated clockwise, a backward signal is also rotated clockwise.

From a set vantage point, however, the rotation appears to change depending on the direction of the signal.

In addition to polarization rotation, evanescent coupling of light into magnetic material 10 also generates a phase shift. This non-reciprocal phase shift (NRPS) will reverse when the magnetization sate of the garnet reverses.

For broader context, magneto-optic devices may be used as optical isolators to protect lasers from reflected light that can make lasers unstable and cause damages. A single crystal of garnet may be used in combination with one or more polarizers as a discrete isolator. Garnet may be directly deposited on an optical waveguide to create an integrated optical isolator based on NRPS to the waveguide modes that are induced by magneto-optical effects. In other words, optical modulator 2 may be formed internal to integrated circuit allowing for intra-chip optical communication or inter-chip optical communication in some examples.

This magneto-optical phase shift may be converted to an intensity transmission variation (e.g., to provide amplitude modulation) by inserting the waveguide into a phase sensitivity optical device such as a Mach-Zehnder interferometer or an optical resonator. Integrating a magneto-optical garnet into an optical resonator may reduce the isolator's footprint and increase the isolation.

In some examples, an external magnetic field may be applied to magnetize the garnet. By adjusting the external magnetic field, the direction of isolation may change. However, generation of the magnetic field may not be practical in intra-chip designs. Using a magnetic field to switch the magnetization state of magnetic material 10 may be difficult to integrate into a circuit.

This disclosure describes optical modulator 2 that may operate by switching the magnetization state in thin films of garnet or other magneto-optic materials without the application of an external magnetic field. The switching may be achieved by various techniques developed in spintronics technology, such as injection of spin polarized current, spin torque transfer, spin orbit torque by spin Hall effect (SHE), and electric field controlled spin switching. For example, controller 20 may deliver the electrical field to modulate the optical signal for optical communication. When the magnetization state of the garnet film is switched, the corresponding NRPS may be reversed and may cause intensity modulation in a phase sensitive configuration, similar to an interferometer or resonator. Therefore, in such a device, the optical output may be modulated by the input spin current or the magnetic state of the input port. This disclosure may refer to optical modulator 2 as a "spin magneto-optical modulator." As described, magnetic material 10 may be have its magnetization state set by an electrical signal, and the magnetization state modulates the optical output at through port 6 or drop port 8.

Optical modulator 2 may have two coupling waveguides, such as through port 6 and drop port 8. A layer of magnetic garnet film with strong magneto-optical coefficient may be on top of a section of optical ring 4. The transverse magnetic (TM) optical mode in the waveguide of optical ring 4 may couple into the garnet layer of magnetic material 10 and experience NRPS with a sign depending on the direction of in-plane magnetization state of the garnet film. Because of this phase shift, when the in-plane magnetization state of the garnet film is switched, the resonant wavelength/frequency of optical ring 4 shifts. If the wavelength of the input optical signal is set to the ring resonant wavelength at one magnetization state, the signal may transmit, or "drop," to drop port 8. When the magnetic material 10 is switched between arrows 12A and 12B and the ring resonant wavelength is shifted, the optical signal may not transmit to drop port 8 but instead to through port 6. Therefore the output at drop port 8 or through port 6 may be modulated by the magnetization state of the magnetic material within magnetic material 10. The majority spin state, or some other characteristic, of the electric signal may also be used to switch the magnetization state of the magnetic material within magnetic material 10.

For instance, the wavelength of the optical signal outputted by optical device 30A may be at a first wavelength. If the resonance wavelength of optical ring 4 is the same as the first wavelength, then substantially all of the optical signal couples into optical ring 4 and travels counter-clockwise through optical ring 4, couples into drop port 8 and outputs drop port 8. If the resonance wavelength of optical ring is different than the first wavelength, then substantially all of the optical signal outputs port 6 and none couples into optical ring 4.

Magnetic material 10 may cause an optical signal traveling in different directions around optical ring 4 to experience different phase delays depending on the magnetization state of magnetic material 10. The phase delay experienced by the optical signal may be related to the actual distance that the optical signal travels. Therefore, magnetic material 10 may effectively add distance for the optical signal to travel. Optical ring 4 may have a resonant frequency that is associated with a resonant wavelength, depending on the phase delay induced by magnetic material 10. Therefore, the magnetization state of the magnetic material 10 may affect the resonant frequency and the resonant wavelength by increasing or decreasing the effective distance that the optical signal travels in optical ring 4. Magnetic material 10 may thereby break the directional symmetry of the ring resonator, treating optical signals differently depending on their direction of travel. If the direction of the optical signal remains constant, and the magnetization state of magnetic material 10 switches, the output at through port 6 or drop port 8 may toggle from on to off, or vice versa. Thus, optical modulator 2 may function as an interferometer.

The resonant wavelength of optical ring 4 may be referred to as a ring resonance wavelength. An optical signal at the ring resonance wavelength may build up over multiple round trips in optical ring 4 due to constructive interference. An optical signal with a wavelength equal to the ring resonance wavelength may then output to through port 6 or to drop port 8. Optical signals with optical wavelengths that are not equal to the resonant wavelength may output to a different port than optical signals at the resonant wavelength.

The magnetization state of the magnetic material 10 may set the resonance wavelength of optical ring 4 by modulating optical signals that pass through magnetic material 10. As the magnetization state of the magnetic material switches, the output port of the optical signal may switch too. In some examples, for a first magnetization state of the magnetic material 10, substantially all of the optical signal may output to through port 6 because the resonance wavelength of optical ring 4 may be the same as the wavelength of the optical signal. In some examples, for a second magnetization state of the magnetic material 10, substantially all of the optical signal may output to drop port 8 because the resonance wavelength of optical ring 4 may not be the same as the wavelength of the optical signal. "Substantially all" may refer to a high percentage of the optical signals, such as 80% or 90%, and in some examples greater than 99%. When substantially all of the optical signals output to one port, substantially none of the optical signals may output to the other ports.

Figure 2:
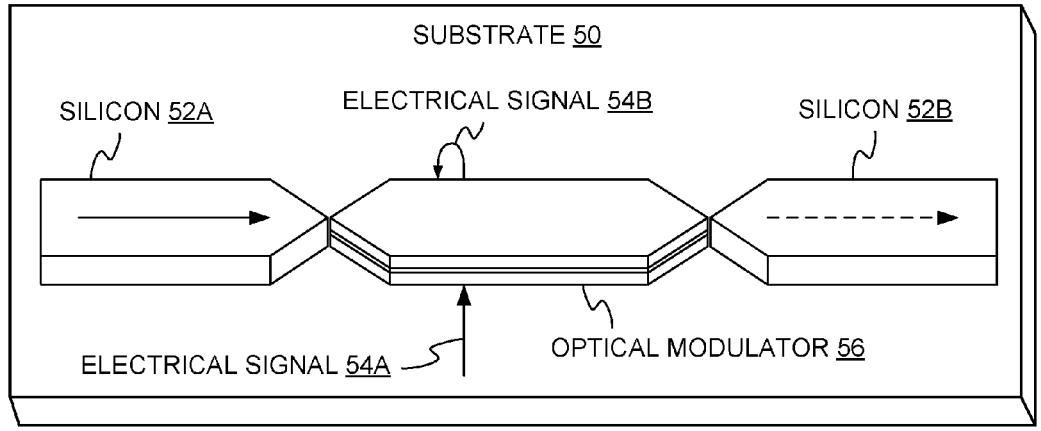
FIG. 2 is a block diagram illustrating an optical modulator connected in series with an optical channel of silicon waveguide, in some examples of this disclosure.
Figure 3:
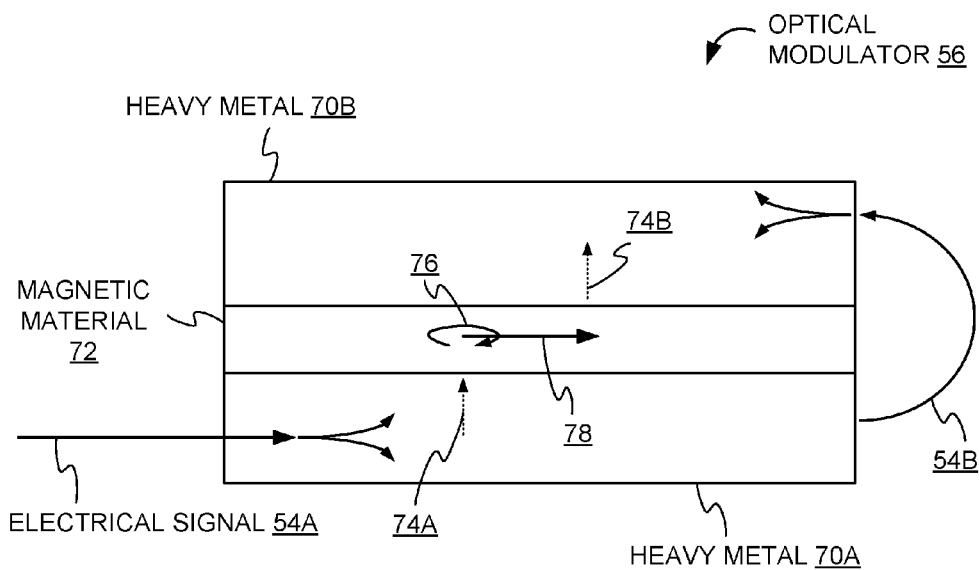
FIG. 3 is a block diagram illustrating an optical modulator with two conductive layers of metal that sandwich a layer garnet with proper magneto-optical properties, in some examples of this disclosure.

FIG. 2 is a block diagram illustrating an optical modulator connected in series with an optical channel of silicon waveguide. FIG. 3 is a block diagram illustrating an optical modulator with two conductive layers of metal that sandwich a layer of garnet with proper magneto-optical properties, in some examples of this disclosure. FIGS. 2 and 3 are described together for ease of understanding.

Optical modulator 56 and silicon 52 may reside on substrate 50. The arrow in silicon 52A represents an optical signal passing through silicon 52A. Silicon 52A may function as an optical channel or a waveguide. The optical signal may pass through silicon 52A and into optical modulator 56. Optical modulator 56 may control certain characteristics of the optical signal, based on electrical signals 54A and 54B. These characteristics may include a phase shift of the optical signal, a polarization of the optical signal, the amplitude of the optical signal, or a resonant frequency of an optical device. The arrow in silicon 52B is dashed because optical modulator 56 may have modulated the optical signal as it passed through optical modulator 56. In some examples, optical modulator 56 may act as an optical isolator that blocks light from traveling in one direction.

Optical modulator 56 may assist with computation and communication that is based on integrated circuit technology.

The two outer layers of optical modulator 56 may be heavy metal 70A and 70B, which may act as electrical conductors or conducting devices. The inner layer may be magnetic material 72 with low optical absorption, such as garnet or YIG. Electrical signal 54A may enter one side of heavy metal 70A. As it passes through heavy metal 70A, electrical signal 54A may induce spin up current 74A in heavy metal 70A because of spin-orbit coupling. Spin up current 74A may flow upwards into magnetic material 72 and may induce spin torque 76 in magnetic material 72. If spin torque 76 is strong enough, spin torque 76 may switch magnetization state 78 within magnetic material 72. A subsequent reversal of the direction of spin torque 76 may reverse magnetization state 78, provided that spin torque 76 has sufficient strength. Magnetization state 78 may control the effect that magnetic material 72 has on an optical signal passing through magnetic material 72.

Optical modulator 56 may transmit electrical signal 54B through heavy metal 70B. Electrical signal 54B may result from electrical signal 54A after electrical signal 54A passes through heavy metal 70A. Similar to the description of electrical signal 54A, electrical signal 54B may enter one side of the heavy metal 70B. As it passes through heavy metal 70B, electrical signal 54B may induce spin up current 74B in heavy metal 70B because of spin-orbit coupling. Spin up current 74B may flow downwards into magnetic material 72 and may induce spin torque 76 in magnetic material 72.

As used herein, the phrase "deliver an electrical signal to a magnetic material" may mean delivering the electrical signal to a layer that is proximate to the magnetic material, such as heavy metal 70. Through spin current 74 in heavy metal 70, electrical signal 54 has indirect effects on magnetic material 72, such as spin torque 76 and a possible change in magnetization state 78. Thus, although electrical signal 54 does not transmit through magnetic material 72, possibly because magnetic material 72 is an insulator, electrical signal 54 affects the physical characteristics of magnetic material 72.

Optical modulator 56 may contain a metal-insulator-metal (MIM) nano-plasmonic waveguide with ultra-small mode volume and slow light effect. Switching the magnetization state 78 of magnetic material 72 to achieve phase modulation may occur through spin-orbit torque induced by spin Hall effect (SHE) in both heavy metal layers 70A and 70B. With ultra-small optical mode volume and slow light effect, the transverse magnetic (TM) optical mode in magneto-plasmonic optical modulator 56 may be tightly confined in a layer of magnetic material 72, thus creating strong magneto-optical coupling. Heavy metal layers 70A and 70B may include materials with large spin-Hall angle ($\alpha_H$) and low plasmonic loss such as gold (Au), silver (Ag), platinum (Pt), tantalum (Ta), tungsten (W), and their alloys and multilayers. Platinum may have the opposite spin Hall effect of gold. To further enhance spin-orbit torque with reduced charge current, different metals with opposite spin-Hall angle $\alpha_H$—for example, positive in Pt and Au versus negative in Ta and W—may be used in the top and bottom heavy metal layers 70A and 70B, respectively. In such a heterostructure, the spin-orbit torque generated by the forward and returning current flow in each layer may add up to twice the efficiency of spin-orbit switching. A multilayer spin-Hall-effect structure may simultaneously obtain a large spin-Hall angle and low resistance, which may be useful in optical modulator 56 to couple with the plasmonic effect.

According to numerical modeling, the phase modulation in the magneto-plasmonic waveguide can reach 0.005 n/micrometer. Therefore, a Mach-Zehnder modulator in a push-pull configuration may achieve 6 dB modulation depth with only a 20-micrometer-long waveguide. Benefiting from the excellent magneto-optical figure of merit of Bi:YIG, the insertion loss of optical modulator 56 is estimated to be as low as 5 dB. Furthermore, a direct current of ten milliamperes in platinum may generate sufficient spin-orbit torque to switch a thulium iron garnet layer. Given a platinum layer with thickness of 100 nanometers, length of 1000 nanometers, and width of 20 micrometers, the direct-current resistance may be only R=0.4Ω. Therefore, when operating at bitrate B=10 Gb/s and using a direct current of 25 milliamperes, the energy required per bit is given by $I^2R/B$=25 femtojoules per bit. This very low energy consumption may stem from the low resistance of heavy metal 70 based spin-orbit material system. Embedding optical modulator 56 in an optical ring resonator can further significantly reduce energy per bit, albeit with a larger footprint and the need of tuning. Graphene, when used in conjunction with heavy metal material, may produce significantly larger spin-Hall angle, thus allowing the required direct current to be further reduced. The tunable plasmonic properties of graphene can also be utilized to optimize the performance of optical modulator 56.

The plasmonic effect may refer to electron oscillation on the surface of metal. The plasmonic effect may impact how light travels through magnetic material 72. The electrons on the surface of metal may oscillate at a plasma frequency, allowing the light to squeeze into a small space (i.e., magnetic material 72) in between heavy metal layers 70. By having a small optical channel in magnetic material 72, the intensity of the optical signal in magnetic material 72 may increase by a large factor, as compared to the intensity of the optical signal in the silicon optical channel. The thickness of the optical channel of the optical channel may be between 1 nanometer and 100 nanometers. The thickness may be defined as a direction that is perpendicular to the direction that the optical signal is travelling. The thickness of magnetic material 72 in FIG. 4, for example, may be measured in the vertical direction.

A significant advantage of the spin magneto-optical modulator may be its low energy consumption for modulation as discussed above. When spin polarized current is used as the input electrical signal 54, spin current may generate without charge current, therefore electrical power dissipation can be zero or very low. Electrical signal 54 may include the magneto-electrical effect or the electric field effect that is achieved by voltage control of an electric field. The operation speed may no longer be limited by the RC response speed of optical modulator 56 because electrical charge does not need to be accumulated to achieve modulation.

Optical modulator 56 may represent a revolutionary new optical modulator design based on magneto-optic effect and spintronics technology. Optical modulator 56 may achieve optical modulation using spin-polarized current or spin-orbit torque effect, or using an electric field applied on an insulating material, both of which may lead to much lower energy consumption than conventional electro-optical modulators. Modulation of the phase of an optical signal may be achieved through the non-reciprocal phase shift induced in magneto-optic material integrated on dielectric photonic waveguides or metal-insulator-metal (MIM) plasmonic waveguides.

Optical modulator 56, which may be called a spin magneto-optical modulator, may utilize the magneto-optic effect in magnetic material 72, which may lead to non-reciprocal Faraday rotation of the polarization of an optical signal propagating through magnetic material 72. The magneto-optic effect in magnetic material 72 may also cause a phase shift of an optical signal that is propagating through magnetic material 72.

Figure 4:
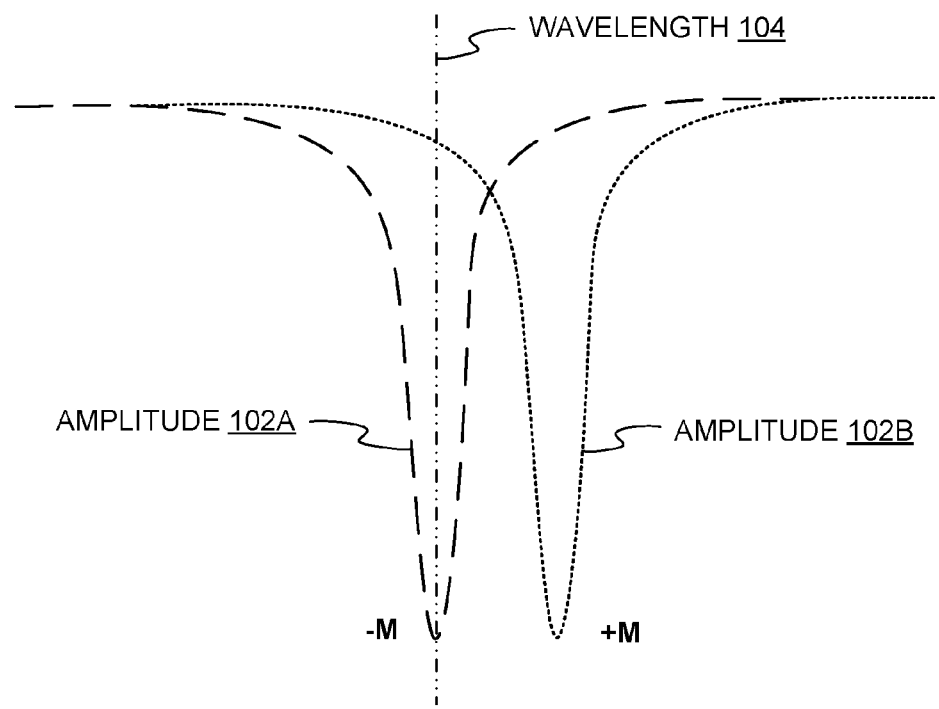
FIG. 4 is a graph illustrating amplitude of an optical resonance response of an optical modulator as a function of wavelength for two magnetization states, in some examples of this disclosure.

FIG. 4 is a graph illustrating amplitude of an optical resonance response of an optical modulator as a function of wavelength for two magnetization states, in some examples of this disclosure. The vertical axis may represent the amplitude of an optical signal that passes through an optical modulator such as an optical ring resonator that includes an optical modulator. In an optical ring resonator, for example, the optical signal may exit at the drop port or the through port. If almost all of the optical signal exits at the drop port, the amplitude at the through port will be very low. The horizontal axis may represent the frequency of optical signals passing through the optical device. The horizontal axis may also represent the wavelengths of optical signals. Thus, FIG. 4 may be a Bode plot of the amplitude response of the optical device. The Bode plot depicts the frequency response of the optical device as a band-reject filter.

Wavelength 104 may be the wavelength of an optical signal passing through the optical device. In some examples, wavelength 104 may be 1,550 nanometers, which is a common wavelength for optical signals. At wavelength 104, amplitude 102A may be very low, and amplitude 102B may be relative high. Amplitude 102A may represent the amount of the optical signal that exits the optical modulator through the drop port when the magnetization state of the magnetic material within the optical modulator is characterized as negative. When the magnetization state of the magnetic material within the optical modulator is characterized as positive, however, amplitude 102B may represent the amount of the optical signal that exits the optical modulator through the drop port. At wavelength 104, amplitude 102B may be closer to zero dB, whereas amplitude 102A may be much lower. This difference may be due to a phase shift that occurs for optical signals within the optical modulator. The magnetization state of the magnetic material may be represented by −M or +M in FIG. 4. In some examples, an input electrical signal that caused a magnetization state of −M would lead to a low output representing binary zero, and an input that caused a magnetization state of +M would lead to a high output representing binary one.

By changing the magnetization state of the magnetic material within the optical modulator, the optical signal that exits at the drop port can go from high to low or vice versa. Consequently, the optical modulator can act as a switch that controls the output. In some examples, an optical ring resonator may have a resonant wavelength at which a maximum amount of an optical signal exits at the drop port or the through port. By switching the magnetization state of the magnetic material, the optical modulator may induce a phase shift in the optical signal and change the resonant wavelength in the optical ring resonator. The phase shift may also adjust the amount of the optical signal that exits at the drop port or the through port.

Figure 5:
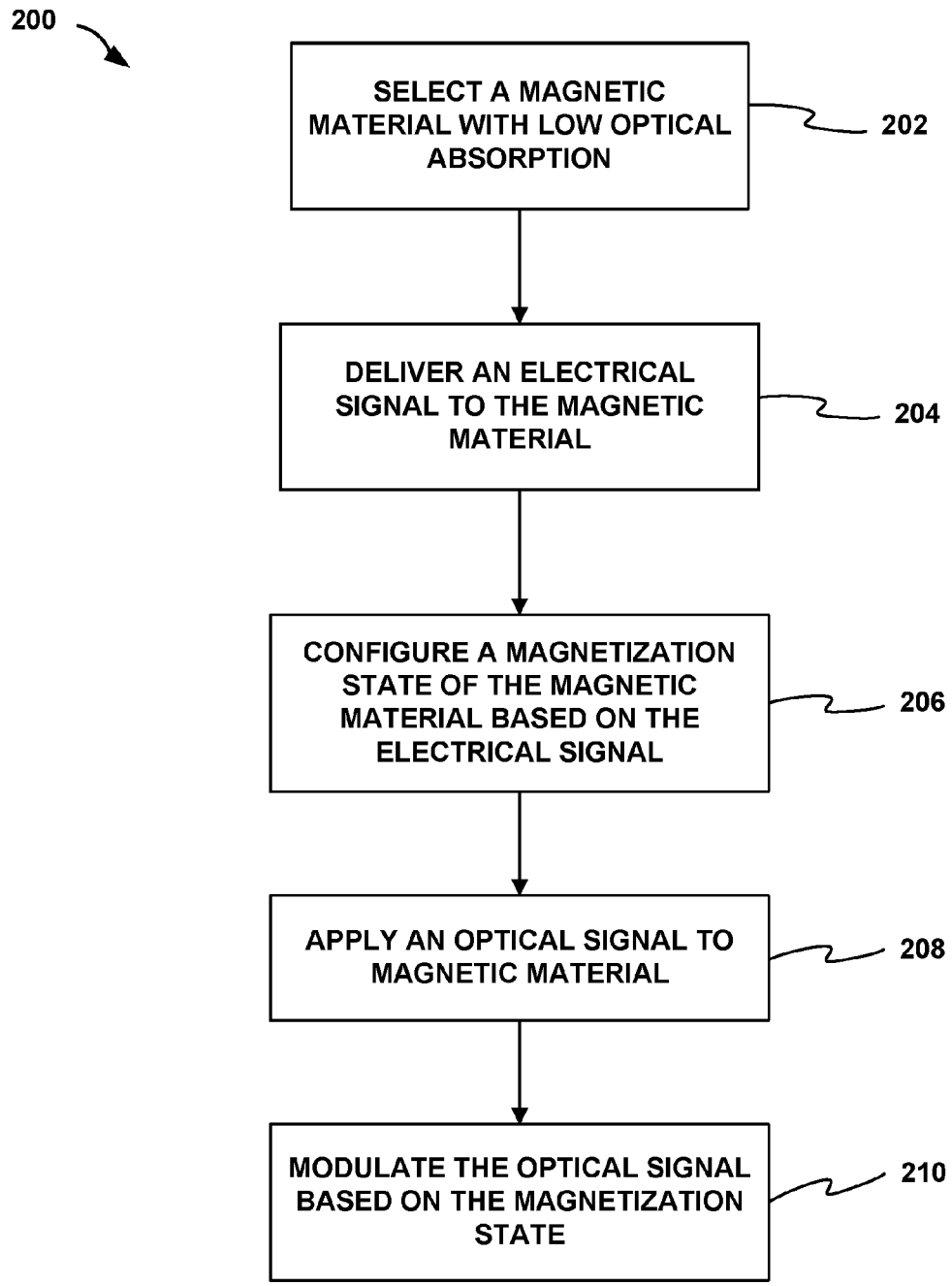
FIG. 5 is a flowchart illustrating an example process for optical modulation, in some examples of this disclosure.

FIG. 5 is a flowchart illustrating an example process for optical modulation, in some examples of this disclosure. For purposes of illustration, the example operations are described below within the context of an optical device. In order to construct the optical device, process 200 involves selecting a magnetic material 72 with low optical absorption (202). Process 200 further involves an electrical conductor 16 delivering an electrical signal to the magnetic material (204). Process 200 further involves configuring a magnetization state of the magnetic material 72, based on the electrical signal (206). Process 200 further involves the application of an optical signal 52 to the magnetic material 72 (208). Process 200 further involves the magnetic material 72 modulating the optical signal based on the magnetization state (210).

Various examples have been described. These and other examples are within the scope of the following claims.

What is claimed is:

1. A device comprising:
   an optical channel configured to transport an optical signal; and
   an optical ring resonator comprising a magnetic material with low optical absorption through which a portion of the optical signal is configured to flow, wherein the magnetic material is configured to:
   receive an electrical signal that sets a magnetization state of the magnetic material, and
   modulate, based on the magnetization state, the portion of the optical signal flowing though the magnetic material.

2. The device of claim 1, wherein the electrical signal comprises at least one of a spin current signal, a voltage signal, or an electric field.

3. The device of claim 1, wherein the magnetization state of the magnetic material sets a resonance wavelength of the optical ring resonator.

4. The device of claim 1,
   wherein, in a first magnetization state of the magnetic material, a resonance wavelength of the optical ring resonator is same as a wavelength of the optical signal and substantially all of the optical signal flows through the optical ring resonator and substantially none of the optical signal outputs via the optical channel, and
   wherein, in a second magnetization state of the magnetic material, the resonance wavelength of the optical ring resonator is different than the wavelength of the optical signal and substantially none of the optical signal flows through the optical ring resonator and substantially all of the optical signal flows through the optical channel.

5. The device of claim 1, wherein the optical channel comprises a first optical channel, the device further comprising a second optical channel, wherein, in a first magnetization state of the magnetic material, substantially all of the optical signal flows through the optical ring resonator and through the second optical channel and substantially none of the optical signal outputs via the first optical channel, and wherein, in a second magnetization state of the magnetic material, substantially all of the optical signal flows through the first optical channel and substantially none of the optical signal flows through the optical ring resonator and through the second optical channel.

6. The device of claim 1, wherein the magnetic material is configured to modulate the optical signal by at least rotating a polarization of the optical signal.

7. The device of claim 1, further comprising:
a heavy metal coupled to a first side of the magnetic material, wherein the heavy metal is configured to:
receive the electrical signal; and
apply a spin-orbit torque induced by the electrical signal to set the magnetization state of the magnetic material.

8. The device of claim 7, wherein the heavy metal comprises a first heavy metal, the device further comprising:
a second heavy metal coupled to a second side of the magnetic material opposite the first side, wherein the second heavy metal is configured to:
receive the electrical signal;
apply the spin-orbit torque induced by the electrical signal to set the magnetization state of the magnetic material.

9. The device of claim 7,
wherein a thickness of the magnetic material is in a range of 1 nanometer to 100 nanometers, and
wherein the heavy metal comprises one of, an alloy of, or a multilayer of: gold, silver, platinum, tantalum, or tungsten.

10. The device of claim 1,
wherein the optical channel comprises a first optical channel,
wherein the device comprises an integrated circuit including the first optical channel, a second optical channel, and the optical ring resonator, and
wherein the magnetic material is deposited upon the second optical channel of the integrated circuit.

11. The device of claim 1, wherein the magnetic material comprises a magnetic garnet having non-reciprocal phase shift (NRPS) optical characteristic.

12. A method comprising:
delivering an electrical signal to a magnetic material with low optical absorption;
setting, based on the electrical signal, a magnetization state of the magnetic material;
setting, based on the magnetization state, a resonance wavelength of an optical ring resonator including the magnetic material;
applying an optical signal to the magnetic material; and
modulating, based on the magnetization state, the optical signal.

13. The method of claim 12, wherein the electrical signal comprises at least one of a spin current signal, a voltage signal, or an electric field.

14. The method of claim 12,
wherein delivering the electrical signal to the magnetic material comprises delivering the electrical signal to a heavy metal coupled to a first side of the magnetic material; and
wherein the method further comprises applying, based on the electrical signal, a spin-orbit torque to set the magnetization state of the magnetic material.

15. The method of claim 14,
wherein the heavy metal comprises a first heavy metal;
wherein delivering the electrical signal to the magnetic material further comprises delivering the electrical signal to a second heavy metal coupled to a second side of the magnetic material opposite the first side; and
wherein the method further comprises applying, based on the electrical signal, a spin-orbit torque to set the magnetization state of the magnetic material.

16. The method of claim 15,
wherein a thickness of the magnetic material is in a range of 1 nanometer to 1,000 nanometers, and
wherein the heavy metal comprises one of, an alloy of, or a multilayer of: gold, silver, platinum, tantalum, or tungsten.

17. The method of claim 12, wherein the magnetic material is deposited upon an optical channel of an integrated circuit.

18. The method of claim 12, wherein the magnetic material comprises a magnetic garnet having non-reciprocal phase shift (NRPS) optical characteristic.

19. A device comprising:
an optical channel configured to transport an optical signal;
a magnetic material with low optical absorption through which a portion of the optical signal is configured to flow; and
a heavy metal coupled to a first side of the magnetic material, wherein the heavy metal is configured to:
receive an electrical signal, and
apply a spin-orbit torque induced by the electrical signal to set a magnetization state of the magnetic material,
wherein the magnetic material is configured to modulate, based on the magnetization state, the portion of the optical signal flowing though the magnetic material.

20. The device of claim 19,
wherein the heavy metal is a first heavy metal,
wherein the device further comprises a second heavy metal coupled to a second side of the magnetic material opposite the first side, wherein the second heavy metal is configured to:
receive the electrical signal; and
apply the spin-orbit torque induced by the electrical signal to set the magnetization state of the magnetic material.

* * * * *